(No Model.)
C. L. BELLAMY.
ROLLER CHAFE IRON.
No. 531,500.  Patented Dec. 25, 1894.
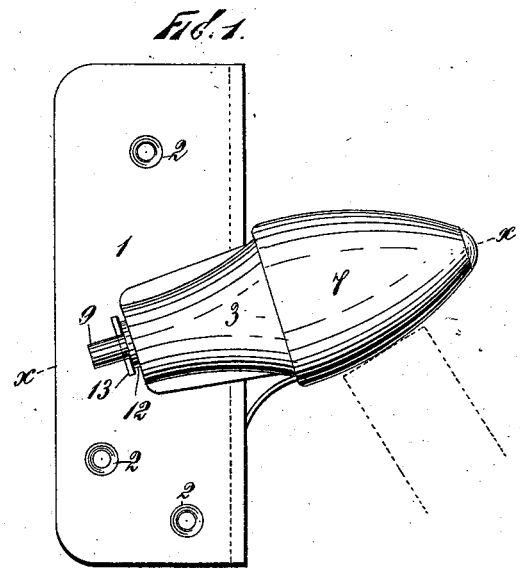
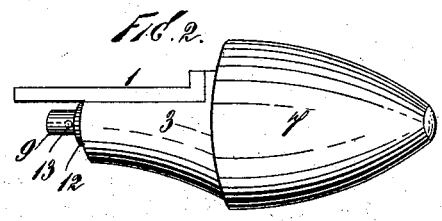
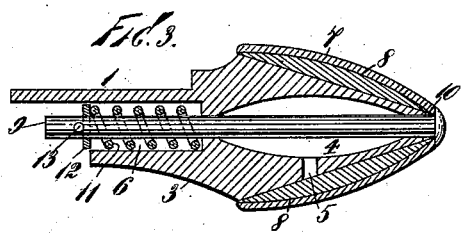
Witnesses:
John Buckler,
Lillian B. Hubbard
Inventor:
Charles L. Bellamy.
By A. M. Pierce,
Attorney.

UNITED STATES PATENT OFFICE.

CHARLES L. BELLAMY, OF ARLINGTON, NEW JERSEY.

ROLLER CHAFE-IRON.

SPECIFICATION forming part of Letters Patent No. 531,500, dated December 25, 1894.

Application filed March 29, 1894. Serial No. 505,533. (No model.)

*To all whom it may concern:*

Be it known that I, CHARLES L. BELLAMY, a citizen of the United States, residing in Arlington, Hudson county, State of New Jersey, have invented a new and useful Improvement in Roller Chafe-Irons, of which the following is a specification.

My invention relates especially to devices employed upon wagons, carriages, &c., to protect the body or frame from injury by the tire of the wheel when cramped or turning, and has for its object the provision of a simple, cheap and effective chafe iron, which will not only protect the body or frame, but will prevent the wearing off of the edge of the tire, which is always caused by chafing irons of ordinary construction.

To attain the desired end, my invention consists essentially in a conical, revoluble chafe iron, mounted upon a rigid bearing projecting from a plate for securing to a wagon body or frame; and my invention also involves certain other novel and useful combinations or arrangements of parts, and peculiarities of construction and operation, all of which will be hereinafter first fully described, and then pointed out in the claims.

In the accompanying drawings, Figure 1 is a bottom plan view of my improved roller chafe iron. Fig. 2 is a side view of the same, reversed in position from Fig. 1. Fig. 3 is an axial, sectional view at line $x$—$x$ of Fig. 1, the iron being reversed, as in Fig. 2.

Like numerals of reference, wherever they occur, indicate corresponding parts in all the figures.

1 is the body of the iron made of suitable material, and arranged to be secured to the under edge of the side of a wagon or carriage box, to the supporting frame, or to side bars, by means of screws or the equivalents, passing through perforations, 2, in the plate 1.

Formed integral with and projecting from the plate 1, at an angle to the front thereof, is a conical bearing, 3. This bearing is made hollow at 4, for the reception of oil, and has a feeding hole at 5 communicating with the interior of the bearing 3. 6 is a depression at the inner end of the bearing 3.

7 is a conical, revoluble wearing piece, preferably conoidal in shape, rather than exact cone, as illustrated in the drawings, for reasons to be hereinafter explained. The interior of the wearing piece 7 is lined with Babbitt metal, 8, the inner surface whereof conforms to the conical surface of the bearing 3.

9 is a pin or bolt, which passes through a perforation 10 at the apex of the conoid 7, and projects beneath the plate 1.

11 is a spring bearing against the bottom of the cavity 6, at one end, and against a washer, 12, held in place upon the bolt 9 by a pin, 13, passing through a perforation in said bolt.

In assembling the parts, the hollow 4 is filled with lubricating substance, and the parts secured in place. When in position for use, the center only of the wheel tire will come in contact with the piece 7, as illustrated by the dotted lines in Fig. 1, and consequently the edges of the tire will not be worn off, or the piece 7 cut into by the tire, and the piece 6 will be caused to revolve by contact with the tire. By the peculiar construction and arrangement of the conoid 7 and its bearings, great strength is acquired, and danger of breaking of the bearing is obviated. As the pressure of the tire is inward, there is no tending to force the piece 7 outward, but toward the base of the support or bearing. Any wear which takes place of the bearing or interior of the conoid 7 is taken up by the automatic action of the spring 11 drawing inward upon the pin or bolt 9, and said arrangement effectually prevents rattling of the parts.

Having now fully described my invention, what I claim as new therein, and desire to secure by Letters Patent, is—

1. A roller chafing iron in which is comprised a rigid bearing arranged to be secured to a vehicle body, or frame, in combination with a revoluble conoid wearing piece mounted upon said bearing, and arranged to receive the impact of the center of the wheel tire substantially as shown and described.

2. In a device of the character herein specified, the combination with a conical bearing mounted upon a fixed base and extending therefrom at an angle, of a conical revoluble wearing piece mounted upon said bearing, and arranged to receive the impact of a vehicle wheel upon its periphery, whereby the wearing piece is caused to revolve, and is forced toward the base of the bearing substantially as shown and described.

3. In a device of the character herein specified, the combination with a conical bearing made hollow and provided with a lubricating perforation, of a conical wearing piece mounted upon said bearing and held in place by a longitudinally yielding pin or bolt, substantially as shown and described.

4. In a device of the character herein specified, a conical, revoluble wearing piece arranged to receive the impact of the center of the wheel tire.

5. In a chafe iron, the combination with a fixed conical bearing mounted upon a supporting base and extending therefrom at an angle, of a revoluble wearing piece mounted thereon, and arranged to receive the impact of a vehicle wheel, and to be revolved thereby, and be forced toward the base of its bearing substantially as shown and described.

CHARLES L. BELLAMY.

Witnesses:
A. M. PIERCE,
LILLIAN B. HUBBARD.